(12) United States Patent
Mihailescu et al.

(10) Patent No.: US 10,427,226 B2
(45) Date of Patent: Oct. 1, 2019

(54) TRAVELING SAW SAMPLE CUT SYSTEM

(71) Applicant: ATLAS TUBE CANADA ULC, Harrow, Ontario (CA)

(72) Inventors: Gheorghe Mihailescu, Southampton, PA (US); Ted Gawlowski, Windsor (CA); Marcello Cuzzolino, Windsor (CA)

(73) Assignee: Atlas Tube Canada ULC, Harrow Ontario (CA)

( * ) Notice: Subject to any disclaimer, the term of this patent is extended or adjusted under 35 U.S.C. 154(b) by 357 days.

(21) Appl. No.: 15/358,875

(22) Filed: Nov. 22, 2016

(65) Prior Publication Data

US 2018/0141141 A1    May 24, 2018

(51) Int. Cl.
*B23D 59/00* (2006.01)
*B23D 47/04* (2006.01)
*G05B 19/042* (2006.01)

(52) U.S. Cl.
CPC ......... *B23D 59/001* (2013.01); *B23D 47/042* (2013.01); *B23D 59/008* (2013.01); *G05B 19/042* (2013.01); *G05B 2219/45144* (2013.01)

(58) Field of Classification Search
None
See application file for complete search history.

(56) References Cited

U.S. PATENT DOCUMENTS

| 7,792,602 B2 * | 9/2010 | Dick ................... B23D 59/008 144/356 |
| 2015/0014467 A1 * | 1/2015 | Fockedey ............. B21C 47/245 242/527.5 |

* cited by examiner

*Primary Examiner* — Robert K Carpenter
(74) *Attorney, Agent, or Firm* — BakerHostetler (57) ABSTRACT

A saw and inspection system configured to allow for cutting a sample portion of a tube and inspect it without removing the tube from the production line. The sample portion of the tube may be cut with a saw and the sample portion is moved to the inspection table via a conveyer belt. This allows for a more rapid inspection of the tube without having to remove the tube from the production line, cut the sample portion and then inspect it.

20 Claims, 5 Drawing Sheets

TRAVELING SAW SAMPLE CUT SYSTEM

FIELD OF THE INVENTION

The present invention relates generally to a saw system. More particularly, the present invention relates to a travelling saw system that cut samples from a tubing.

BACKGROUND OF THE INVENTION

Typically, a pipe or tube is made by taking a piece of steel strip, and rolling it into a cylinder. After rolling, the formed tube is welded using various welding techniques known in the art. The mill produces tubing that needs to adhere to strict quality standards. The requirement may require samples to be taken from a tube produced from a parent coil of steel at the beginning, middle and end of that coil. The typical test method was to take samples from a tubing section off line, which took up to an additional 20 minutes to acquire a sample for inspection. Additionally, the inspection typically occurs in a different part of the plant by separate personnel rather than the saw operator. Thus, too much time elapsed between producing the tube in obtaining off-line sample for testing and then obtaining the test results. Further, additional personnel are needed to test the formed product.

Thus there is a need to for the ability take and test sample on-line and provide real-time feedback during mill production. This allows for continuous tube production while samples are cut and testing conducted.

SUMMARY OF THE INVENTION

The foregoing needs are met, to a great extent, by the present invention, wherein in one aspect an apparatus or system is provided that can cut sample pieces from a tube, deliver the several pieces to the inspection station and an inspection can be performed while tube production continues.

In accordance with one embodiment of the present disclosure, a saw and an inspection system for a tube that includes a saw controlled by a processor, the saw configured to cut a sample portion of a tube while the tube is being milled, a memory in communication with the processor, wherein the memory includes processing instructions that controls the saw and the inspection system, a sensor in communication with the processor, the sensor configured to detect an indicator on a surface of the tube, a delivery device configured to deliver the cut sample portion of the tube, and a first conveyor configured to receive the cut sample portion of the tube from the delivery device, and transport the cut sample portion of the tube to an inspection station.

In accordance with another embodiment of the present disclosure, a saw for cutting a tube is disclosed and includes a blade receiving housing configured to receive a blade that cuts a sample portion of a tube being milled without removing the tube from a production line, a body portion having a generally planar portion, a processor configured to control an operation of the saw, a memory in communication with the processor, wherein the memory includes processing instructions that controls the saw, a sensor in communication with the processor, the sensor configured to detect an indicator on a surface of the tube, and a wireless interface that communicates with the processor and allows the processor to access a remote computing device or let the remote computing device control the saw, wherein the blade receiving housing includes a generally sloping portion that allows the cut sample portion of the tube to fall onto a delivery device.

In still another embodiment, a saw and an inspection system for a tube is provided and includes an accumulator station configured to hold a steel coil, a welder station configured to weld steel coils together to form a sheet of steel, a cutting station that includes a saw controlled by a processor, the saw configured to cut a sample portion of a tube formed from the sheet of steel while the tube is being milled, a memory in communication with the processor, wherein the memory includes processing instructions that controls the saw and the inspection system, a sensor in communication with the processor, the sensor configured to detect an indicator on a surface of the tube, a delivery device configured to deliver the cut sample portion of the tube, and a first conveyor configured to receive the cut sample portion of the tube from the delivery device, and transport the cut sample portion of the tube to an inspection station.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present invention provides traveling saw and inspection system that can cut samples from a tube for inspection while the tube is still on the production line.

Figure 1:
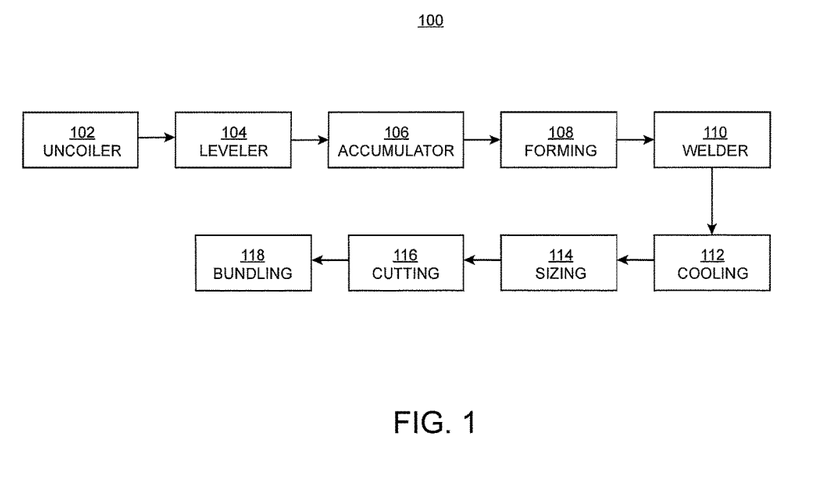
FIG. 1 illustrates an exemplary factory layout with the traveling saw and inspection system according to an embodiment of the disclosure.

FIG. 1 illustrates an exemplary factory layout 100 with a traveling saw 212 and inspection system 200 according to an embodiment of the disclosure. The factory layout 100 may include various stations including an un-coiler station 102, a leveler station 104, an accumulator station 106, a forming station 108, a welder station 110, a cooling station 112, sizing station 114, a cutting station 116 and a bundling station 118. There may be other stations (not shown) that may be included in the factory layout 100 or the stations may be combined or even reduced.

At the un-coiler station 102, one or more rolled steel coils maybe present and ready to be uncoiled into sheets of steel. The rolled steel coils may be positioned on arms and powered by coil keepers (not shown). The coils may also be sorted into different widths or sizes in order to manufacture the desired pipe diameter and length. The rolled steel coils may be uncoiled from the coil keepers using various techniques and fed into the leveler 104. Additionally, in one embodiment, the unrolled steel coils may be joined together by welding in order to create larger sheets of steel having similar width or size. A strip flattener to flatten the ends sufficiently for welding may be utilized then using an end welder to shear the trailing edge of the first coil and the leading edge of the next coil, so that the two pieces can be welded together.

At the leveler 104, the uncoiled steel coils may be flattened using pinch rollers, as known in the art, and fed into an accumulator 106. The steel coils may be accumulated at the accumulator station 106 ready to be formed into various sized pipes. Strips of the steel coils may be stored horizontally or vertically in the accumulator station 106. From the accumulator station 106, the strips of steel coils are fed into forming station 10, where they may be formed into tubes using a series of forming rolls by initially forming into a U-shaped and then into a cylindrical shape with open edges. The formed tubes are fed into the welder 110 where the open edges are welded by heating the open edges to a welding temperature through high frequency welding, and press welded by forge roles. After welding, the weld flash that occurred outside and inside of the pipe is trimmed using cutting tools such as a carbide tool. Threads at each end of the pipe may also be formed. If the pipe will be used in a harsh environment, various dipping and spraying techniques and heat treatments may be utilized in order to apply protective coatings such as a rustproof coating. In addition to or alternatively, if longer lengths of piping are needed, then additional scarf welding may be performed at welder station 110.

After the welding is performed, the welded tubes are fed into the cooling station 112 where water or other coolant may be used to cool the welded tubes. Then cooled welded tubes are fed into the sizing station 114 where the welded tubes may be sized or reshaped as needed. This process also allows for stress relief of the water tubes so that properties are normalized in the tubes. After the sizing station 114, the welded tubes are fed into the cutting station 116, where test samples of the welded tubes may be cut using the saw 212 (FIG. 2) and also the desired length of the tube may be cut. This is further discussed below.

After the cutting station 116, the welded tubes are fed into a bundling station 118. Prior to the bundling station 118, the various pipes that were formed and created may be inspected (as discussed below) and then sent to the bundler to be bundled together for shipping. It should be noted that the stations are but exemplary and that the various processes that are described for each station may be performed at other stations and/or more or less stations may be utilized depending on the type of pipe being manufactured.

Figure 2:
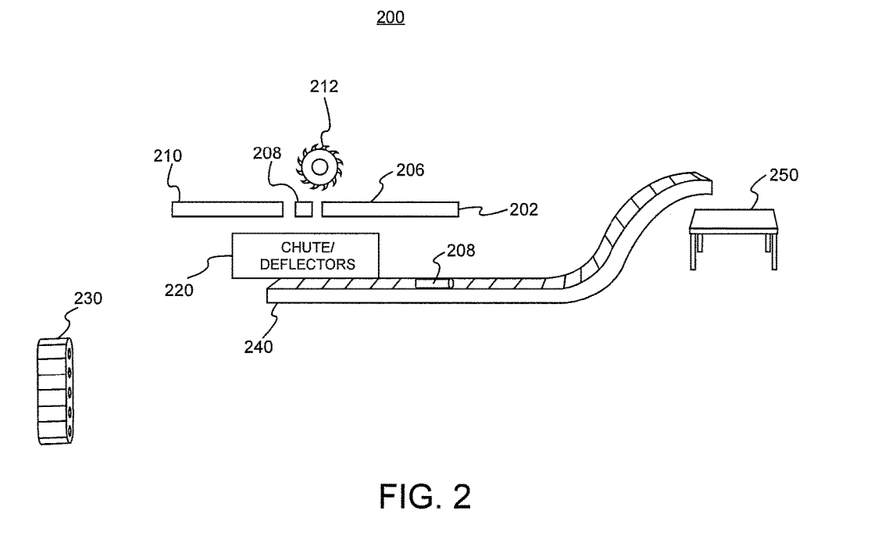
FIG. 2 illustrates the traveling saw and inspection system 200 according to an embodiment of the disclosure.

FIG. 2 illustrates the traveling saw and inspection system 200 according to an embodiment of the disclosure. The traveling saw and inspection system 200 may include one or more saw 212 or one saw 212 with multiple blades, a chute 220 and/or a first conveyor 230, a second conveyor 240, and a sample testing area 250. Thus, the cutting station 116 is further described in FIG. 2.

Although one saw 212, for example, a flying saw, is shown in FIG. 2, there may be two, three, four, or more saw 212 with multiple blades that may be used in the various embodiments. The tube 202 that needs to be inspected may be similar to the ones that are created in the system 100 shown in FIG. 1. As noted above, relevant regulations require samples (beginning, middle, end of a parent steel coil) of a steel coil to be inspected and thus, a portion of tube 202 needs to be cut and inspected. In an embodiment shown in FIG. 2, a middle portion of the tube to 202 will be cut. An operator would know when a sample of the steel coil that was formed into tube 202 would need to be taken by noticing an indicator on the tube's outer surface such as a "sample mark" or a "sample hole" or other known indicators (including chemical). As shown below, the sample tube 208 is pushed by the incoming tube on the mill, which causes the sample tube 208 to be pushed away from saw 212, allowing the sample to fawn to the conveyor 208.

When tube 202 enters the cutting station 116 and the operator sees the indicator, the operator can manually cut the sample tube 208 with the saw 212 which cuts tube 202 into a first tube portion 206 and a second tube portion 210. Alternatively, the saw 212 may use a sensor (412 of FIG. 4) to determine that the indicator is present. The sensor 412 may be a light sensor, a visual sensor such as a camera, an acoustic sensor, a chemical sensor and the like. In one embodiment, the sensor 412 may be configured to detect a weld (coil to coil) to identify the beginning of the coil or the end of the coil. The sensor 412 may be attached to the saw 212 or remotely positioned from the saw and communicates via a wireless or wired link as further discussed in FIG. 4. The sensor 412 may also use the indicator as a fixed point from which to cut the sample piece with the saw 212. In one embodiment, the sensor 412 may be used to determine the fixed point and the saw 212 can be configured to automatically cut the sample tube 208 according to relevant regulation or requirement. Thus, when the weld or indicator is detected, the saw can reverse and measures a 300 mm in length sample piece. In other embodiments, the fixed point may be 50 mm, 100 mm, 200 mm, 300 mm from the indicator so that the sample to 208 may be any length such as 50 mm, 100 mm, 200 mm, 300 mm and the like. It should be noted that the cutting point from the fixed point may range from less than 10 mm to more than 1000 mm depending on the relevant regulation and/or the operator.

FIG. 2 also illustrates a chute 220 that may be positioned below the tube 202 at a predetermined angle such as 20°, 30°, 40°, 50°, 60° and the like so that the sample tube 208 simply falls due to gravity when it is cut from first tube portion 206 and second tube portion 210. The first tube portion 206 and second tube portion 210 may have their respective ends be clamped or alternatively on a supporting surface (not shown) that includes an opening to allow the cut sample tube 208 to fall on the chute 220. This allows for the saw to synchronize its blade with the clamps and the mill speed in order to cut the sample tube 208. The sample tube 208 may be transported or deflected by the chute 220 onto second conveyor 240. This process may be repeated for the middle and end of the coil and the subsequent coils, as needed.

In another embodiment, the first conveyor 230 may be used instead of the chute or is used in addition to the chute so that when the sample tube 208 falls on the first conveyor 230, the first conveyor 230 can transport the sample tube 208 to a second conveyor 240, which transports the sample to 208 to the sample testing area 250. The sample testing area 250 may include a sample table 260. The first and second conveyor 230, 240 may be manually, hydraulically, or motor driven depending on the manufacturer of the conveyors. In another embodiment, the chute 220 and/or the first conveyor 230 may simply transport the sample tube 2082 sample testing area 250 which is located at the end of the chute and/or first conveyor. In other words, in this embodiment there is no need for the second conveyor 240 and the time in which an inspection can start it shorten.

At the sample testing area 250 various tests may be conducted on the sample tube 208 including tests related to mechanical properties and the technological properties of the tube 208. Test may include tensile test at ambient temperature or at elevated temperature, hardness test, bending impact test at various temperatures, bending test, flattening test, flaring test, flanging test, ring test, crushed test, reverse flattening test, bend tests of welds and the like. It should be noted that any tests may be performed at the sample testing area 250, including chemical testing.

Figure 3A:
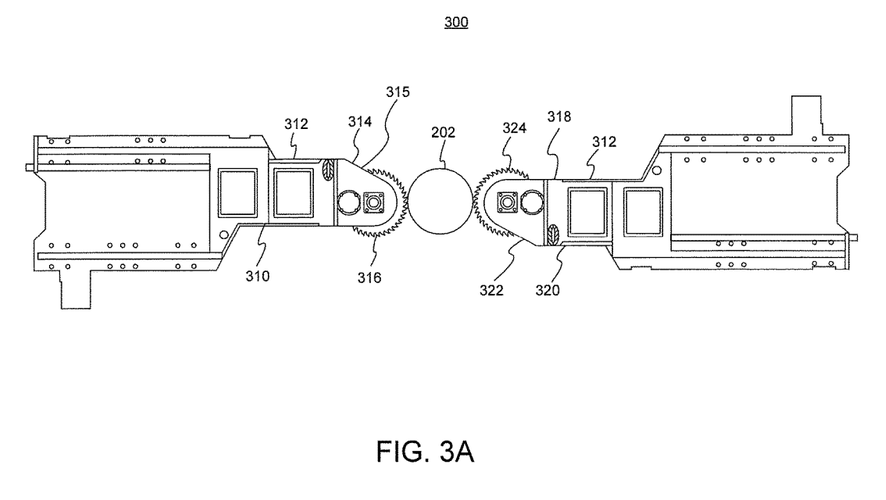
FIG. 3A illustrates first saw and second saw according to an embodiment of the invention.

FIG. 3A illustrates first saw 310 and second saw 320 according to an embodiment of the invention. In one embodiment, the first saw 310 and the second saw 320 are configured to cut the tube 202 from the sides. Alternatively, or in addition to, the first and second saw 310, 320 can rotate in relation to each other so that one saw (for example first saw 310) travels from current position to a top portion of the tube 202 while the other saw (for example second saw 320) travels from the current position to a bottom portion of the tube 202 and vice versa. In another embodiment, the first saw 310 may be positioned on top of the tube 202 and the second saw 320 may be positioned on the bottom of the tube 202 and cut toward each other similar to being cut from the side. It should be noted that the first and second saws 310, 320 may travel in the same direction and/or the opposite direction depending on the desired cut and their programming. Additionally, the first and second saws 310, 320 may move or rotate around the tube 202 independent of each other. The movement of the first and second saws 310, 320 may be actuated by motor driven, hydraulically driven, pressure driven (are not shown) and the like and controlled by a processor 402 (FIG. 4) and the associate software 406 (FIG. 4).

The first saw 310 includes a body portion 312 having a generally planar portion 318 and a first blade receiving portion 314 that is configured to receive first blade 316. The first blade receiving portion 314 includes a generally sloping portion 315 that is angled or sloped with respect to the generally planar portion 318. The angle may be 10°, 15°, 25°, 45°, 60° and the like. The second saw 320 also includes the body portion 312 having a generally planar portion 318. The second saw 320 also includes a second blade receiving portion 322 configured to receive the second blade 324. It should be noted that the generally planar portion 318 of the second saw 320 extends to the second blade receiving portion 322 and does not include a generally sloping portion similar to the generally sloping portion 315 of the first saw 310. In other embodiments, the second saw 320 includes the generally sloping portion 315.

Figure 3B:
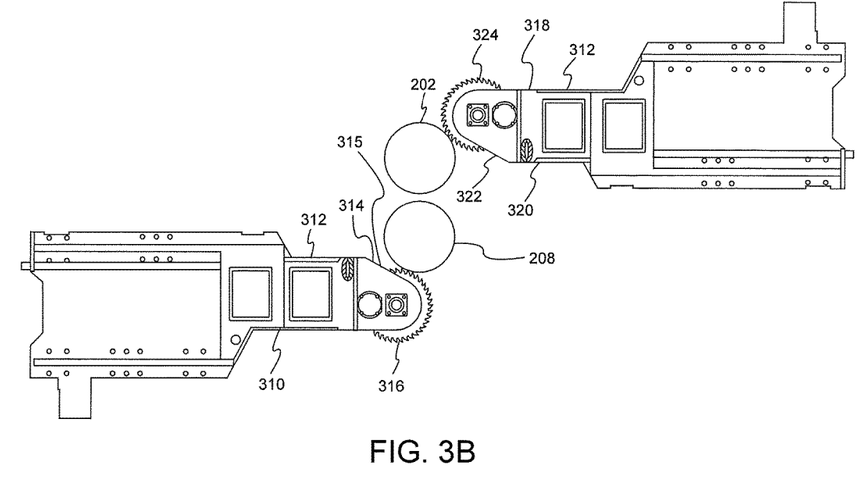
FIG. 3B illustrates movement of the first saw and the second saw according to another embodiment of the invention.

FIG. 3B illustrates movement of the first saw 310 and the second saw 320 according to another embodiment of the invention. In this embodiment, the first saw 310 may move from its current position shown in FIG. 3A and cut the tube 202 when it travels to a lower position as shown. The second saw 320 may move from its current position shown in FIG. 3A and cut the tube 202 on the other side of the first saw when it travels to an upper position as shown. As the sample tube 208 is cut, gravity will act on it and make it fall onto the saw positioned underneath the tube 202 and thus, first saw having the generally sloping portion 315 allows the sample tube 208 to fall onto the chute or first conveyor belt. Otherwise, if the second saw 320 instead of the first saw 310 is moved to the lower position, the cut sample tube 208 would fall onto the generally planar portion 318 and thus, may get stuck on it and not roll down to the chute or the first conveyor belt. However, in the other embodiment in which both the first and second saws have the generally sloping portion 315 then either saws may rotate to the lower position of the tube 202.

Figure 4:
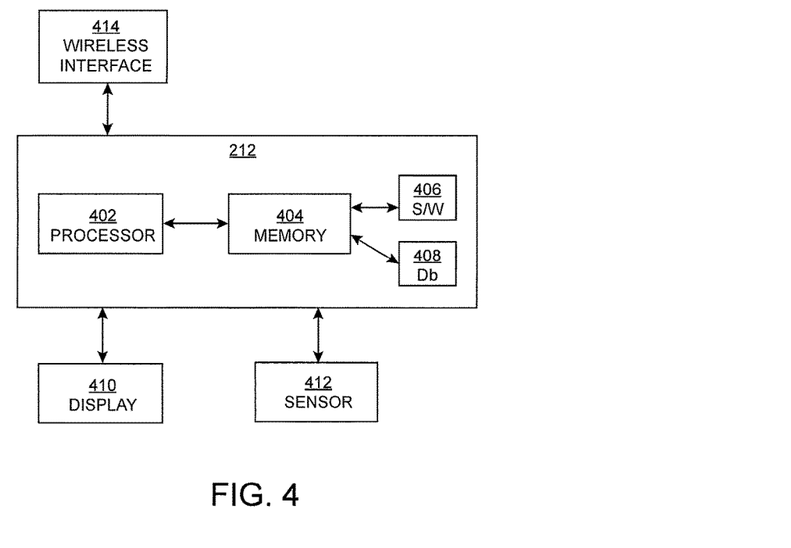
FIG. 4 illustrates components of a saw according to an embodiment of the invention.

FIG. 4 illustrates components of saw 212 according to an embodiment of the invention. Although saw 212 is shown in this embodiment, the components are applicable to all saws, including the saws discussed herein. The components may include a processor 402 in communication with memory 404, which may include software 406 and database 408. The software 406 and database 408 may be stored in the memory 404 or be stored on a remote computing device located in the mill or outside the mill. Other components of the saw 212 in which the processor 402 to communicate with may include a display 410, a sensor 412 and a wireless interface 414.

The processor 402 may be any type of processor including a controller, one more core processor. ASIC, FPGA, and the like. The memory 404 may be any type of memory including volatile and nonvolatile memory such as RAM, ROM, EPROM, flash, hard drive and the like. The memory 404, in one embodiment, may include the software 406, which has computer instructions to control the movement of the saw 212 (and other saws) and other components of the saw according to the various embodiments described herein so that the saw can detect, measure and cut the sample piece as desired. The software may also include instructions to control the entire milling process including the components described in FIG. 1. Software may also include image recognition instructions in order to compare an image of indicator to images of indicators used for relevant tubes being inspected. The memory 404 may also include the database 408, which may include information about various types of coils used in the milling process including specifications such as length, material of the coils, indicators used on the coils and the like, and the tube which are formed from the coils such as diameter, length, and the like. The database 408 may store various regulations of the United States and other countries such as Canada, Mexico, Brazil, China and the like that are related to the sample testing of the coils such as when to cut the sample and length of the sample. The database also includes other information for use with other components of the saw 212 such as information regarding various wireless protocols for the wireless interface 414, and information regarding various indicators that are used in and outside of the U.S. and the like.

Display 410 may be integral with the saw 212 or be remote therefrom including in a remote location. The display can be any type of display including TIFF, LED, OLED, Plasma, SVGA, VGA and the like and can include a touch screen surface to interact with the user. The display may communicate via a wired or wireless connection with the processor so that the processor may receive the user's input.

The sensor 412 could be any type of sensor including acoustic, chemical, visual and the like. The sensor 412 may be integral with the saw 212 or be remotely positioned to detect the punched hole or indicator on the tube 202 as it is being milled. For example, the sensor 412 may be a camera such as a CCD camera, and the like. An image of the indicator may be captured by the camera and then compared to images in the database in order to confirm that indicator is indeed a proper indicator from which the sample cut can be made. The sensor 412 may communicate with the processor, memory, software and database via a wired or wireless connection.

Wireless interface 414 allows for wireless communication with the components of the saw 212, other remote computing devices or the components in the milling process (of FIG. 1). The wireless interface may communicate with a network (not shown), which may be the Internet, other distributed network, WLAN, LAN, and the like. In another embodiment, the wireless interface may receive a wired connection such as include USB (universal serial bus), FireWire, serial, parallel and the like while wireless connections may be via Wi-Fi, Bluetooth, Zigbee, near field communications, radiofrequency, satellite, cellular and the like. With the wireless interface 414, the processor 402 can be controlled by remote access or allow automated operations the saw and inspection. Additionally, the processor 402 may also access information remotely on other computing devices.

In one embodiment, the command to cut a sample comes from the operator via the wireless interface or wired connection such as a button. The processor and memory with the software analyze the request and when the next part is being cut it will also cut a sample preferably after a delay to allow the traveling saw to go to a home position.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A saw and an inspection system for a tube, comprising:
a saw controlled by a processor, the saw configured to cut a sample portion of a tube while the tube is being milled;
a memory in communication with the processor, wherein the memory includes processing instructions that controls the saw and the inspection system;
a sensor in communication with the processor, the sensor configured to detect an indicator on a surface of the tube;
the saw being configured to cut the sample portion of the tube while the tube is being milled in response to the sensor detecting the indicator on the surface of the tube;
a delivery device configured to deliver the sample portion of the tube cut by the saw; and
a first conveyor configured to receive the sample portion of the tube from the delivery device, and transport the sample portion of the tube to an inspection station.

2. The system of claim 1, wherein the delivery device comprises at one of the following: a chute or a second conveyor.

3. The system of claim 1 further comprising a database stored in the memory, wherein the database contains information regarding specifications of the tube including a diameter of the tube, a length of the tube, and indicators used for the tube.

4. The system of claim 1, wherein:
the saw is further configured to cut the sample portion of the tube at a fixed point from the indicator detected by the sensor; and
the saw is further configured with a sloping portion configured to allow the sample portion of the tube to fall onto the delivery device.

5. The system of claim 1, wherein:
the saw is further configured to cut the sample portion of the tube at a fixed point from the indicator detected by the sensor;
the saw is further configured to cut the sample portion of the tube at a second point that is a predetermined length from the fixed point; and
the saw is further configured with a sloping portion configured to allow the sample portion of the tube to fall onto the delivery device.

6. The system of claim 1, wherein:
the sensor comprises at least one of the following: a light sensor, a visual sensor, an acoustic sensor, and a chemical sensor; and
the sensor senses the indicator acoustically, visually or chemically depending on a type of indicator on the surface of the tube.

7. The system of claim 1 further comprising:
a wireless interface that communicates with the processor; and
the wireless interface being configured with the processor to implement at least one of the following: access to a remote computing device or control of the saw by the remote computing device.

8. The system of claim 1, wherein the sensor is a camera that is configured to detect the indicator visually, capture an image of the indicator, and compare the image of the indicator to a database of tube indicators to confirm the indicator detected by the camera utilizing image recognition.

9. A saw for cutting a tube, comprising
a blade receiving housing configured to receive a blade that cuts a sample portion of a tube being milled without removing the tube from a production line;
a body portion having a generally planar portion;
a processor configured to control an operation of the saw;
a memory in communication with the processor, wherein the memory includes processing instructions that controls the saw;
a sensor in communication with the processor, the sensor configured to detect an indicator on a surface of the tube;
the saw being configured to cut the sample portion of the tube while the tube is being milled in response to the sensor detecting the indicator on the surface of the tube; and
a wireless interface that communicates with the processor; and the wireless interface being configured with the processor to implement at least one of the following: access to a remote computing device or control of the saw by the remote computing device, wherein the blade receiving housing includes a generally sloping portion that allows the sample portion of the tube to fall onto a delivery device.

10. The saw of claim 9, further comprising a database stored in the memory, wherein the database contains information regarding specifications of the tube including a diameter of the tube, a length of the tube, and indicators used for the tube.

11. The saw of claim 9, wherein:
the saw is further configured to cut the sample portion of the tube at a fixed point from the indicator detected by the sensor; and
the saw is further configured with a sloping portion configured to allow the sample portion of the tube to fall onto the delivery device.

12. The saw of claim 9, wherein:
the saw is further configured to cut the sample portion of the tube at a fixed point from the indicator detected by the sensor;
the saw is further configured to cut the sample portion of the tube at a second point that is a predetermined length from the fixed point; and
the saw is further configured with a sloping portion configured to allow the sample portion of the tube to fall onto the delivery device.

13. The saw of claim 9, wherein:
the sensor comprises at least one of the following: a light sensor, a visual sensor, an acoustic sensor, and a chemical sensor; and
the sensor senses the indicator acoustically, visually or chemically depending on a type of indicator on the surface of the tube.

14. The saw of claim 9, wherein the sensor is a camera that is configured to detect the indicator visually, capture an image of the indicator, and compare the image of the indicator to a database of tube indicators to confirm the indicator detected by the camera utilizing image recognition.

15. The saw of claim 9, further comprising a touch screen display configured to receive input from an operator to control an operation of the saw.

16. A saw and an inspection system for a tube, comprising:
an accumulator station configured to hold a steel coil;
a welder station configured to weld steel coils together to form a sheet of steel;
a cutting station comprising:
a saw controlled by a processor, the saw configured to cut a sample portion of a tube formed from the sheet of steel while the tube is being milled;
a memory in communication with the processor, wherein the memory includes processing instructions that controls the saw and the inspection system;
a sensor in communication with the processor, the sensor configured to detect an indicator on a surface of the tube;
the saw being configured to cut the sample portion of the tube while the tube is being milled in response to the sensor detecting the indicator on the surface of the tube;
a delivery device configured to deliver the sample portion of the tube cut by the saw; and
a first conveyor configured to receive the sample portion of the tube from the delivery device, and transport the sample portion of the tube to an inspection station.

17. The system of claim 16, wherein:
the saw is further configured to cut the sample portion of the tube at a fixed point from the indicator detected by the sensor;
the saw is further configured to cut the sample portion of the tube at a second point located a predetermined length from the fixed point; and
the saw is further configured with a sloping portion configured to allow the sample portion of the tube to fall onto the delivery device.

18. The system of claim 16, wherein the sensor is a camera that is configured to detect the indicator visually, capture an image of the indicator, and compare the image of the indicator to a database of tube indicators to confirm the indicator detected by the camera utilizing image recognition.

19. The system of claim 16, wherein:
the sensor comprises at least one of the following: a light sensor, a visual sensor, an acoustic sensor, and a chemical sensor; and
the sensor senses the indicator acoustically, visually or chemically depending on a type of indicator on the surface of the tube.

20. The system of claim 16, further comprising a database stored in the memory, wherein the database contains information regarding specifications of the tube including a diameter of the tube, a length of the tube, and indicators used for the tube.

* * * * *